United States Patent [19]

Puchalla

[11] Patent Number: 5,573,102

[45] Date of Patent: Nov. 12, 1996

[54] SCRAPER STRIP FOR BELT STRIPPERS USED FOR CLEANING CONVEYOR BELTS

[75] Inventor: Adam Puchalla, Marl, Germany

[73] Assignee: Vulka Industrie-Vulkanisation GmbH, Unna, Germany

[21] Appl. No.: 416,878

[22] PCT Filed: Aug. 19, 1994

[86] PCT No.: PCT/EP94/02755

§ 371 Date: Jun. 5, 1995

§ 102(e) Date: Jun. 5, 1995

[87] PCT Pub. No.: WO95/05987

PCT Pub. Date: Mar. 2, 1995

[30] Foreign Application Priority Data

Aug. 27, 1993 [DE] Germany .............................. 9312877 U

[51] Int. Cl.$^6$ ................................................... B65G 45/12
[52] U.S. Cl. ............................................ 198/497; 198/499
[58] Field of Search ....................................... 198/497, 499

[56] References Cited

U.S. PATENT DOCUMENTS

| | | | |
|---|---|---|---|
| 4,787,500 | 11/1988 | Holz | 198/497 |
| 4,825,996 | 5/1989 | Davidts | 198/497 |
| 5,082,106 | 1/1992 | Schwarze | 198/499 |
| 5,197,587 | 3/1993 | Malmberg | 198/497 |

FOREIGN PATENT DOCUMENTS

| | | | |
|---|---|---|---|
| 0262272 | 4/1988 | European Pat. Off. | 198/497 |
| 0328171 | 8/1989 | European Pat. Off. | 198/499 |
| 0218420 | 9/1988 | Japan | 198/499 |
| 2143792 | 2/1985 | United Kingdom | 198/499 |
| 2259682 | 3/1993 | United Kingdom | 198/497 |

*Primary Examiner*—James R. Bidwell
*Attorney, Agent, or Firm*—Anderson, Kill & Olick P.C.

[57] ABSTRACT

A conveyor belt scraper strip includes a support strip formed of a hollow main section and a pocket section, which is arranged sidewise of the main section and has a plurality of insertion pockets for receiving footings of a plurality of approximately S-shaped wear strips, with the pockets having top openings for enabling insertion and withdrawal of the wear strips.

7 Claims, 2 Drawing Sheets

SCRAPER STRIP FOR BELT STRIPPERS USED FOR CLEANING CONVEYOR BELTS

BACKGROUND OF THE INVENTION

SUMMARY OF THE INVENTION

The invention is directed to a scraper strip for belt scrapers used for cleaning conveyor belts with a carrier strip formed by a hollow section and with elements subject to wear fastened thereon and resting at the moving conveyor belt while in the cleaning position.

Such scraper strips are known in many embodiments, thus for instance from the DE-A-39 15 609 or DE-U-89 03 188, the DE-U-90 06 407 or DE-U-90 11 459, to name only a few examples.

Scraper strips are known from the DE-A-38 31 033 or the GB-A-2 239 228, which are formed by a plurality of individually replaceable scraper blades. For blade replacement screw joints or special safety pins must be disconnected, which involves a comparatively high expenditure of time.

It is a task of the invention to create a solution by means of which such scraper strips can be rapidly replaced without large assembly effort, wherein the scraper strips can adapt in a special manner to the respective operational conditions.

The invention solves this task in a scraper strip of the above-mentioned type by providing the support or carrier strip with insertion pockets for receiving insertion bases or footings located on the wear strips.

This embodiment makes it possible to perform a very fast replacement by knocking the insertion footings or bases of worn scraper strips out of the insertion pockets and by inserting the footings of new scraper strips therein. Since the scraper strip can be adapted to different operational purposes by designing them differently, it is possible to exchange a still intact or serviceable scraper strip against another scraper strip of a different kind if the operational conditions change.

Other embodiments of the scraper strip result from the additional dependent claims.

Thus it is especially expedient to design the wear strips to be approximately S-shaped in cross-section with straight profile regions, wherein one free end constitutes the or the plurality of insertion footings or bases.

In order to confer a certain spring-like or flexural behavior to the scraper strip itself, it can be provided that the central region of the wear strip profile in the inserted position forms an angle relative to the surface of the support strip proceeding from the insertion pocket so as to make a flexural arc available.

In order to especially prevent contaminations or dirt accumulations in such designs of the scraper strip, which possibly would have a negative effect upon the flexural behavior, an appropriate protective plate can also be provided in the invention.

If especially flexible scraper strips are sought, a spring plate can be provided inside of the wear strip. It should be observed at this point, that it is for instance known from the DE-U-90 06 407 to provide perforated support plates from steel inside plastics materials members used as wear stripes, which perforated support plates however exert no influence upon the flexural behavior of the scraper strip itself.

In another embodiment it can also be provided, that the wear strip be disposed with a plurality of such wear strips next to each other; this also assists in the flexible replaceability, for instance, if a partial region of the entire strip were to be destroyed, this partial region can be configured in a simple manner according to the invention.

The support strip itself can also be designed to be symmetrically identical in reversal, in such a way that both sides of the wear strips can be disposed in insertion pockets by utilizing their insertion footings or bases, as this is furthermore provided in the invention in an additional refinement, wherein support strips complemented on both sides viewed for themselves are known from the previously listed state-of-the-art.

BRIEF DESCRIPTION OF THE DRAWINGS

In the following the invention is described with particularity with the help of drawings showing examples thereof. It is shown on.

DETAILED DESCRIPTION OF THE PREFERRED EMBODIMENTS

Figure 1:
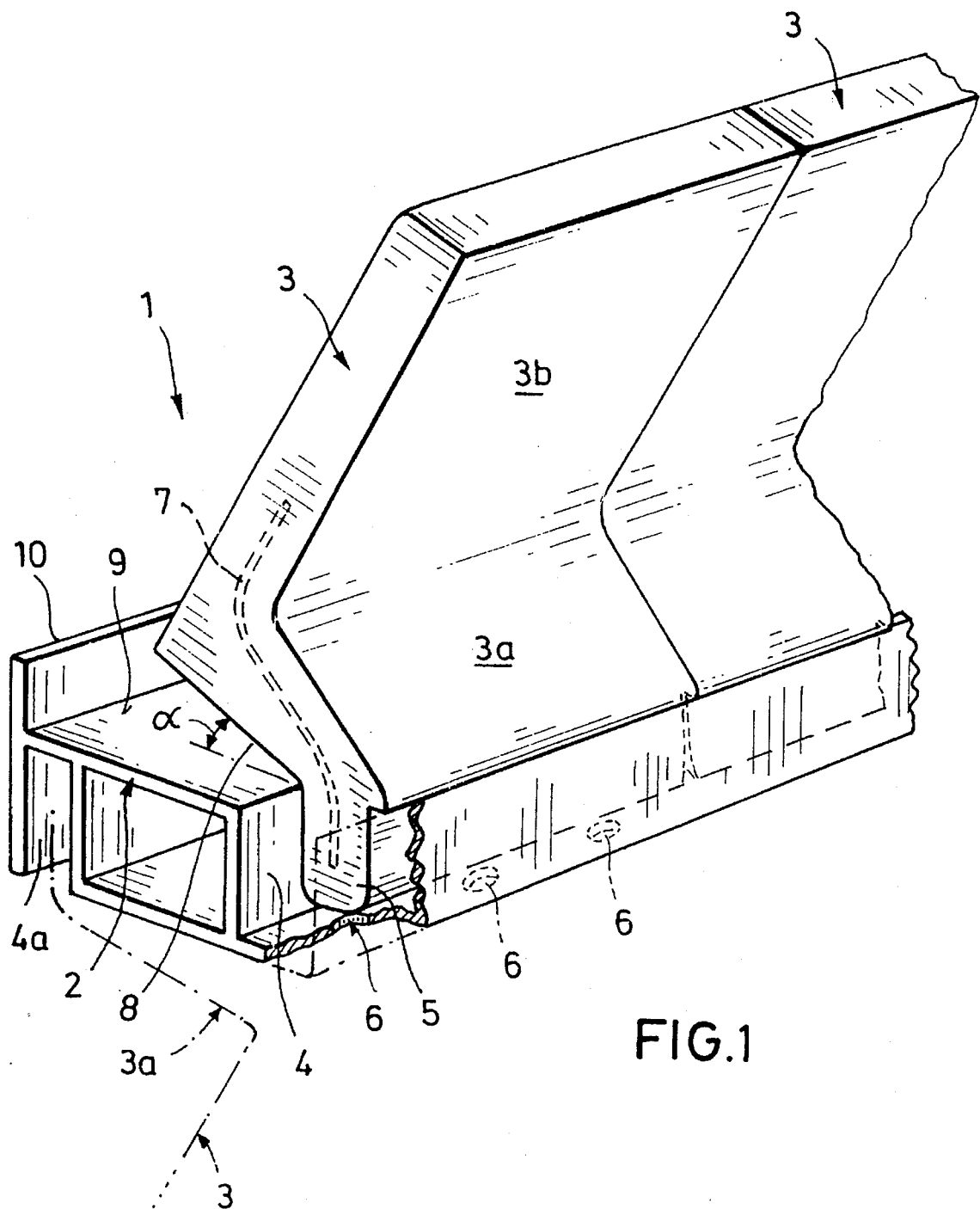
FIG. 1 is a simplified partial perspective view of a scraper strip according to the present invention.

The scraper strip designated overall by the numeral 1 is essentially formed by a support strip 2, which is partially configured as a hollow section, and by wear strips 3, of which two are shown in outline in the figure.

The support strip 2 has insertion pockets at least on one side for receiving insertion footings 5 of the wear strips 3.

The insertion pockets 4 can have recesses 6 in their base region, which are outlined partially by a dotted line in the figure, this in order to enable knocking the insertion footings 5 out by means of a suitable tool. Naturally, the insertion pockets can be designed without the base region, meaning in that case so as to be completely open, which however necessitates lateral tie rods towards the head section of the support strip.

As is indicated in the figure, each wear strip has an approximately S-shaped cross-section in such a way, that three wear strip regions are formed, namely the insertion footing or base 5, an angled-off or elbow central region 3a and a principal region 3b largely subject to wear, which is again angled-off or elbowed towards the central region 3a. Internally the interior of at least one portion of the insertion footing 5 and of the central region 3a as well as the transition region to the wear section 3b can be provided with a cast-in or integral spring plate 7, which is shown in broken lines in the figure.

The bent central region 3a is shaped in such a way, that the bottom side 8 facing the support strip forms an angle alpha with the corresponding surface 9 of the support strip 2, in such a way that, when load is applied, a spring motion is made possible onto the surface 9 and away from same. In order to largely avoid contamination of this partial region, a protective plate 10 can be provided, which is either designed to form one single piece with the profile or however is riveted or welded thereto, which in our case is of no particular importance.

The support strip 2 can be designed to be symmetrically identical in reversal, meaning being equipped on both sides with insertion pockets 4 or 4a, so that additional wear strips 3a can be inserted therein, which again is outlined in the figure only by broken lines.

Figure 2:
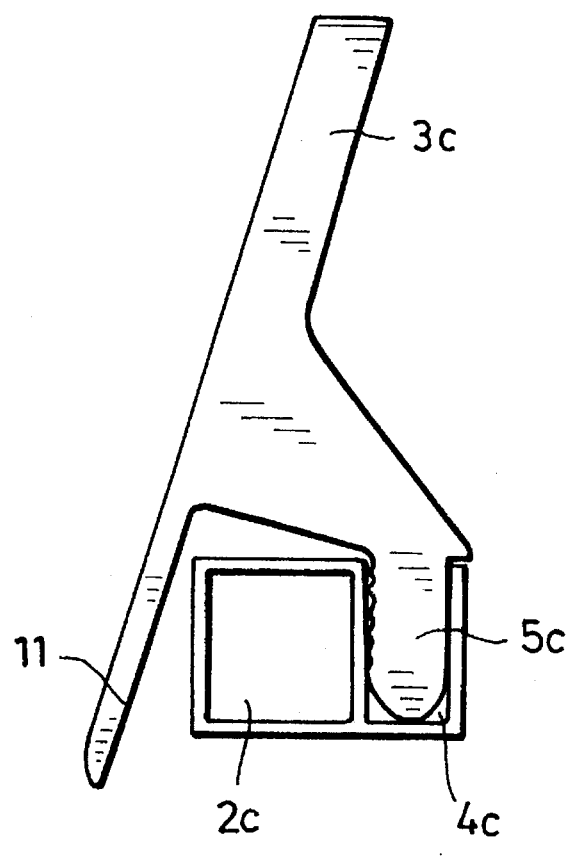
FIGS. 2 and 3 are simplified side views of modified embodiments of a scraper strip according to the present invention.

FIG. 2 shows a wear strip 3c inserted into a support strip 2c, which has a rear apron-like extension 11 by way of protecting the support strip 2c from dirt, which extension can be fabricated in one piece from the material of the wear strip 3, it can however also be bonded, vulcanized or fastened in another way to the rear side of the wear strip 3c. The insertion footing is designated by 5c, the insertion pocket by 4c.

Figure 3:
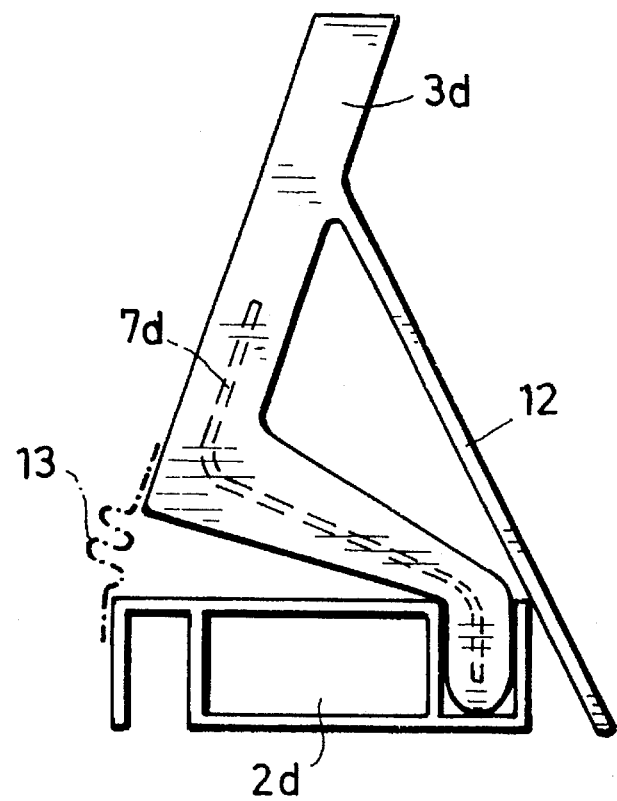

A front protection apron 12 can be provided in the embodiment example shown on FIG. 3 for a wear strip designated by 3d, which is inserted into a support strip 2d. The rear region is to be protected by a bellows type foil 13 bonded thereon or be protected according to the embodiment examples in FIGS. 1 and 2, which is outlined in FIG. 3 by broken lines only.

I claim:

1. A conveyor belt scraper strip, comprising:

a plurality of approximately S-shaped wear strips having each a free end portion defining an insertion footing; and a support strip for supporting the wear strips and having a main hollow section having a support bottom surface for supporting the scraper strip on an appropriate support and a top surface, and a first pocket section arranged sidewise of the main section and having a plurality of pockets for receiving insertion footings of the plurality of wear strip, each pocket having a top opening for enabling insertion and withdrawal of an insertion footing of a respective wear strip.

2. A scraper strip according to claim 1, wherein each wear strip has a working wear region and a central region located between the footing and the wear region and extending at an angle relative to the top surface of the main section to form a spring arc.

3. A scraper strip according to claim 1, further comprising a protective plate extending upward from the top surface of the main section at a side of the main section remote from the pocket section.

4. A scraper strip according to claim 2, wherein each wear strip has an embedded approximately S-shaped spring plate having opposite end portions extending in the wear portion and the footing, respectively, and a central portion connecting the opposite end portion and lying in the central region of the wear strip.

5. A scraper strip according to claim 1, where in the support strip further includes a second pocket section arranged sidewise of the main section opposite the first section with the insertion pockets having bottom openings.

6. A scraper strip a set forth in claim 1, wherein each wear strip is provided with at least one protective apron at one of front and rear sides of the wear strip.

7. A scraper strip as set forth in claim 1, wherein each pocket has an opening in a bottom surface thereof to provide for knocking an insertion footing of a respective wear strip out of the pocket for replacing the wear ship.

* * * * *